(12) United States Patent
Spahr

(10) Patent No.: US 11,458,765 B2
(45) Date of Patent: Oct. 4, 2022

(54) QUICK RELEASE DEVICE

(71) Applicant: DT SWISS INC., Grand Junction, CO (US)

(72) Inventor: Stefan Spahr, Lengnau (CH)

(73) Assignee: DT SWISS INC., Grand Junction, CO (US)

( * ) Notice: Subject to any disclaimer, the term of this patent is extended or adjusted under 35 U.S.C. 154(b) by 817 days.

(21) Appl. No.: 16/365,473

(22) Filed: Mar. 26, 2019

(65) Prior Publication Data

US 2019/0225013 A1  Jul. 25, 2019

Related U.S. Application Data

(63) Continuation-in-part of application No. 15/432,744, filed on Feb. 14, 2017, now Pat. No. 10,293,638.

(30) Foreign Application Priority Data

Mar. 29, 2018 (DE) .......................... 102018107703.3

(51) Int. Cl.
*B60B 27/02* (2006.01)
*B62K 25/02* (2006.01)

(52) U.S. Cl.
CPC ............ *B60B 27/026* (2013.01); *B62K 25/02* (2013.01); *B60Y 2200/11* (2013.01); *B60Y 2200/13* (2013.01); *B62K 2025/025* (2013.01); *B62K 2206/00* (2013.01)

(58) Field of Classification Search
CPC  B60B 27/026; B62K 25/02; B62K 2025/025; B62K 2206/00
See application file for complete search history.

(56) References Cited

U.S. PATENT DOCUMENTS 4,508,614 A  4/1985 Yan
4,598,614 A  7/1986 Kipp
(Continued)

FOREIGN PATENT DOCUMENTS

DE       29714945 U1   11/1997
DE    202015005524 U1   11/2015
(Continued)

OTHER PUBLICATIONS

German Search Report from German Patent Application No. 102018107703.3, dated Nov. 27, 2018.

*Primary Examiner* — Scott A Browne
(74) *Attorney, Agent, or Firm* — Greer, Bums & Crain, Ltd

(57) ABSTRACT

A clamping mechanism for mounting and demounting bicycle components of at least partially muscle-powered two-wheeled vehicles such as bicycles, including at least one operating lever and a clamping component. The clamping mechanism includes two clamping parts, one of which clamping parts is a clamping sleeve and connected with the operating lever, and another of which clamping parts is formed at the clamping component. The operating lever can be moved from an engagement position; in which it is non-rotatably connected with the clamping component to a rotary position in which it is freely rotatable relative to the clamping component. In the rotary position, the operating lever is disposed closer to the clamping component than in the engagement position.

29 Claims, 7 Drawing Sheets

(56) References Cited

U.S. PATENT DOCUMENTS

| | | | |
|---|---|---|---|
| 5,165,762 A * | 11/1992 | Phillips | B62K 25/02 |
| | | | 403/372 |
| 6,089,675 A | 7/2000 | Schlanger | |
| 6,742,849 B1 * | 6/2004 | Denby | B62K 25/02 |
| | | | 301/124.2 |
| 8,186,768 B2 | 5/2012 | Spahr | |
| 2008/0116658 A1 | 5/2008 | Schroeder et al. | |
| 2013/0328385 A1 | 12/2013 | Kuo | |
| 2015/0054254 A1 | 2/2015 | Spahr et al. | |
| 2016/0052588 A1 | 2/2016 | Walthert et al. | |
| 2017/0239984 A1 | 8/2017 | Walthert et al. | |

FOREIGN PATENT DOCUMENTS

| | | |
|---|---|---|
| EP | 3040259 A1 | 7/2016 |
| IT | 1400057 B1 | 5/2010 |
| TW | 201540595 A | 11/2015 |
| WO | 2008/145496 A2 | 12/2008 |

\* cited by examiner

QUICK RELEASE DEVICE

BACKGROUND

The present invention relates to a quick release mechanism and a quick release device, in particular for at least partially, and preferably primarily, muscle-powered two-wheeled vehicles such as bicycles.

Many different types of quick release devices for attaching the wheels of bicycles have become known in the prior art. The wheels of racing bicycles are for example releasably attached by using quick release devices wherein the required locking forces are generated by tilting over the quick release lever. In particular, in the case of mountain bikes and also in other bicycles, it has been shown that the rigidity generated by the applied retaining force can be improved further.

EP 1 801 005 B1 has disclosed a quick release for bicycles where the clamping force is not generated by tilting the quick release lever but is independent thereof. The quick release lever is connected with a screw thread so that the desired clamping force is applied by the number of rotations of the quick release lever. For placing the quick release lever in the desired rest position, the quick release lever can be pulled axially outwardly and can be freely rotated to the desired rest position. This quick release device works reliably and allows ease of operation. The drawbacks are the comparatively complicated mechanism of the quick release device and the comparatively high weight.

EP 3 040 259 A1 discloses a clamping device for clamping a wheel of a bicycle. The clamping device comprises a hollow axle configured as a traction unit extending in the axial direction through the wheel showing an external thread at one of its ends for screwing the hollow axle with an internal thread in a fork or a dropout of a bicycle frame. A lever unit rotatable around the hollow axle is attached at the other end. The lever unit is pivotable outwardly between a rest position and an active position. In the rest position, the lever unit is positioned closer to the wheel than in the pivoted active position. In pivoting outwardly, some of the teeth at the pivotable lever unit engage in a toothing configured at the end of the hollow axle. The pivotable structure appears to be a disadvantage of the design because of sensitive response to shocks due to the thin material. Damage to the precision-mechanical structure in rough environments or entry of dust and dirt and impairment thereby cannot be excluded, which impedes operation. A more robust and/or encapsulated structure would considerably increase the weight which is not desirable.

A quick release has also become known in the market which is described in the Italian patent application IT FI 2010 0089 A1 having the number 140057. This quick release interacts with a through axle. The through axle comprises a thread at one end of the through axle and at the other end, an insertion opening for a separate quick release lever. For the purpose of mounting, the insertion end of the quick release lever is inserted into the insertion opening of the through axle, wherein an external hexagon at the insertion end of the quick release lever comes into engagement with a corresponding internal hexagon in the through axle. Rotating the quick release lever will now also rotate the form-fittingly connected through axle so that an appropriate number of rotary motions of the quick release lever obtains the desired retaining force of the wheel. Since only one quick release lever needs to be provided for both the front wheel and the rear wheel, this already saves half the weight. Moreover, such a quick release can on the whole be designed so as to weigh less than a quick release according to EP 1 801 005 B1.

The insertion end of the quick release lever according to IT FI 2010 0089 A1 shows such a length that in mounting or demounting the quick release lever can be pulled out of the through axle a certain amount while the external hexagon still retains sufficient engagement with the internal hexagon of the through axle. In this way, there is no risk of the operator's fingers being pinched between the bicycle frame and the quick release lever in one complete rotation of the quick release lever. When the desired clamping force is obtained, the quick release lever is pushed back in. Alternately, the quick release lever can be briefly pulled out of the through axle, rotated to a preferred angular position, and then pushed back in. Both ease of operation and a low total weight are possible. The insertion part inserted into the through axle must consist of a strong material and have a length so that even when it is partially pulled out, the remaining contact surface with the through axle is sufficient without applying the required locking forces. This is why the total weight of the quick release is higher than it is actually required.

DE 10 2014 112 084 A1 discloses a quick release for bicycles having a removable clamping mechanism with an operating lever. The clamping mechanism comprises a clamping component provided with a coupling unit which coupling unit can be inserted into a through axle of a bicycle and non-rotatably coupled therewith. Rotating the operating lever allows screwing the through axle in further or to release it. While the coupling unit is coupled with the through axle, the operating lever may be pulled back outwardly against the force of a coil spring. This will release a coupling between the operating lever and the clamping component and the operating lever can freely rotate relative to the clamping component while the clamping component is non-rotatably coupled with the through axle. Although the known quick release works reliably, it is always urged to the engagement position.

10 2016 103 080 A1 discloses another quick release device where a removable clamping mechanism with an operating lever is provided. The clamping mechanism comprises a clamping component provided with a coupling unit which coupling unit can be inserted into a through axle of a bicycle and non-rotatably coupled therewith. Rotating the operating lever allows screwing the through axle in further or to release it. The clamping mechanism comprises an intermediate device having an actuating unit. The actuating unit ensures in a first position a non-rotatable connection of the clamping component with the operating lever and, in a second position, pivoting of the operating lever relative to the clamping component while the clamping component is non-rotatably coupled with the axle unit. The operating lever always remains in the same axial position. Pressing the actuating unit of the intermediate device releases the non-rotatable coupling of the operating lever with the axle unit. Although the known device operates satisfactorily, it shows a comparatively complicated structure. Moreover, with the operating lever inserted, a user may get caught on an object to then inadvertently shift the clamping force.

It is therefore the object of the present invention to provide another clamping mechanism and quick release device showing a stable construction which is simple in design and reliably prevents inadvertent changes to the clamping force. Moreover, it is advantageous for the invention to additionally overcome at least one of the indicated disadvantages, enabling a low total weight and/or ease of operation, allowing flexible handling and in particular flexible positioning of each of the components.

SUMMARY

A clamping mechanism according to the invention serves to mount and demount any kind of bicycle component, and in particular to mount and demount bicycle components of at least partially muscle-powered two-wheeled vehicles such as bicycles or also of Pedelecs. The clamping mechanism according to the invention comprises at least one operating lever and (in particular connected therewith) a clamping component, the clamping mechanism comprising at least two clamping parts, wherein one of the clamping parts is configured as a clamping sleeve and is connected with the operating lever and another of the clamping parts is configured on the clamping component. The operating lever can be moved (on the whole) in the axial direction from an engagement position non-rotatably connected with the clamping component to a position (in particular freely) rotatable relative to the clamping component. In the rotary position, the operating lever is disposed closer to the clamping component than in the engagement position. In particular, in the rotary position the operating lever is disposed in the axial direction of the clamping component closer to the clamping component than in the engagement position.

The operating lever of the clamping mechanism according to the invention is aligned at a defined angle and preferably substantially orthogonal to (a longitudinal extension of) the clamping component extending in the axial direction. The operating lever is disposed both in the rotary position and in the engagement position at the same defined angle to the clamping component.

The operating lever is preferably straight and elongated. The operating lever may preferably be slightly arcuate, extending between the endpoints preferably perpendicular or nearly perpendicular (+/−5° or +/−10°) to (the longitudinal extension or the axial direction of) the clamping component.

In the rotary position, the operating lever is on the whole disposed over its entire length closer to the clamping component than in the engagement position. In the engagement position, the operating lever is on the whole disposed over its entire length farther away from the clamping component than in the rotary position.

Unlike in the prior art, the operating lever is pulled (entirely) axially outwardly for transferring the operating lever to the engagement position, e.g. to release or attach a wheel. In the normal idle state, the operating lever is closer to, and in particular bears against, the clamping component. If the user inadvertently hits the operating lever or if the operating lever inadvertently gets caught on an object and then turns during transporting a bicycle or during a ride, the clamping force does not change, since in the normal rest position the operating lever is in the rotary position. This is very advantageous.

Another considerable advantage follows from the fact that in the "operating position," the operating lever is located axially farther outwardly. Thus, rotating the operating lever in the engagement position is easier. Interference by frame parts or attachment parts or fastening parts on the bicycle during tightening or releasing is then decreased since in the engagement position the operating lever shows a larger axial distance from the frame or the fork. This facilitates operation for the user.

Another advantage is the stable and compact structure. The compact structure prevents the entry of dirt. Hollow spaces in a toothing are not clogged by dust particles in combination with humidity in the invention. The function is maintained even in unfavorable weather and ambient conditions.

Preferably, the operating lever is moved from the rotary position at least 3 mm or 5 mm or 6 mm or 8 mm or 10 mm axially outwardly from the rotary position to the engagement position.

Preferably, the clamping sleeve is fixedly connected with the operating lever. Preferably, the clamping sleeve surrounds the clamping component in its entirety. The clamping sleeve in particular surrounds the clamping component in its entirety in the engagement position and in the rotary position. This largely prevents the entry of dirt, dust and/or water.

Preferably, the operating lever is biased to the rotary position by a biasing device.

In particular, at least one retention device is configured or provided at the clamping mechanism to retain movement of the operating lever at least in the rotary position (at least in sections).

Retention is in particular understood to mean impeding and preferably stopping while retention does not block relative motion. At any rate, retention prevents automatic movement. It does not move by itself. Nor does it in particular not (only) under the influence of gravity. Movement requires a certain amount of force which, however, does not tire the user even after actuating ten times (or a hundred times).

In some configurations, there is no effective (resulting) force in the rotary position which would automatically return the operating lever to the engaging position. Retaining by the retention device is then preferably sufficient for leaving the operating lever in the rotary position.

In other configurations, the operating lever is biased in the rotary position and returns in particular automatically from the engagement position to the rotary position.

Preferably, the biasing device forms a retention device which retains a pivoting of the operating lever relative to the clamping component at least in the rotary position. It is possible and preferred for the biasing device or at least part thereof to rotate along while the operating lever is pivoting. The friction between the biasing device and the clamping component and/or the clamping sleeve retains a pivoting motion of the operating lever. This results in the operating lever maintaining its position once set in normal riding operation.

Preferably, the biasing device comprises at least one coil spring that is supported on the clamping component at one of its ends and on the clamping sleeve at the other of its ends.

In particular, when compressed to lockout the coil spring forms an axial stopper for an axial movement of the operating lever, in particular outwardly. This provides for a defined axial end for orientation to the user.

It is also possible and preferred to have an axial stopper disposed at the clamping component to restrict axial movement of the operating lever. This stopper may be formed e.g. by a disk which is attached to the clamping component during mounting. Preferably, an internal toothing at the clamping sleeve may form an axial stopper together with a disk (detachably) attached to the clamping component.

The clamping component shows a push button preferably attached to one respectively the axially outwardly end. The push button may be used as a counter bearing in operation. The push button is preferably detachably fastened to the clamping component, in particular screwed to or into the clamping component. The disk may be fastened by screwing the push button on.

The clamping mechanism is very advantageous since it allows ease of operation combined with an overall low total weight. It is possible for the operating lever to remain in the rotary position to which it has been transferred. Then, a sufficient force for returning the operating lever to the engagement position is not effective. The retention may be high enough although the user can overcome it by applying some force.

The clamping mechanism does not require a clamping component of a large axial length, since it is not necessary to pull the clamping component partially out of a bicycle component for operating the operating lever without the risk of pinching fingers. The operating lever must only be pulled outwardly. The operating lever for generating the desired clamping force or for reducing the applied clamping force may be rotated a certain amount and then transferred to the rotary position. Then the operating lever can be rotated back without affecting the clamping force. Thereafter the operating lever may once again be manually brought to the engagement position where it is rotated to further increase (or decrease) the clamping force. Therefore, the clamping component may be designed shorter and lighter in weight. The clamping component does not need to be configured any longer than required to ensure non-rotatable coupling even with the clamping component half pulled out.

A clamping mechanism according to the invention can be employed for mounting and demounting a great variety of bicycle components so that only one single, suitable clamping mechanism needs to be stored on a two-wheeled vehicle. Optionally, the user may carry the clamping mechanism on his person or in a backpack or a bag or the like so that the bicycle components attached with the clamping mechanism are protected from theft to a certain degree.

A clamping mechanism according to the invention may also comprise an axle unit. The axle unit may be fixedly and even non-detachably connected with the clamping component. The axle unit is preferably screwed and/or glued to the clamping component. This provides a connection that cannot detach in operation.

This axle unit shows an axle extending in the axial direction respectively an axle defining an axial direction. Furthermore, the axle unit preferably comprises a locking means at a first end of the axle unit and a fastener at a second end of the axle unit.

Thus, a clamping mechanism according to the invention may form a complete quick release device for the wheels of bicycles. This quick release device is in particular provided for at least partially and preferably primarily muscle-powered two-wheeled vehicles such as bicycles, and comprises a bicycle component such as an axle unit and a clamping mechanism. The clamping mechanism serves or is suitable to mount and demount the axle unit to and from a two-wheeled vehicle. The clamping mechanism comprises at least one operating lever and a clamping component in particular connected therewith. The clamping mechanism comprises at least two clamping parts of which one clamping part is configured as a clamping sleeve and fixedly connected with the operating lever and of which another clamping part is formed on the clamping component. The clamping component can be non-rotatably coupled to the axle unit, e.g. manually. The clamping component may also be decoupled from the axle unit, e.g. manually. No further tools are required for coupling and decoupling the clamping component to and from the axle unit. The operating lever of the clamping mechanism can be moved from an engagement position in which it is non-rotatably connected with the clamping component, to a rotary position in which it is (in particular freely) rotatable relative to the clamping component, while the clamping component may be, and in particular is, non-rotatably coupled to the axle unit. This means that the clamping component is e.g. non-rotatably coupled to the axle unit while the operating lever of the clamping mechanism can at the same time be shifted to the rotary position in which the operating lever is (freely) rotatable relative to the clamping component. In the rotary position the operating lever is disposed closer to the clamping component than in the engagement position.

At least one retention device may be formed or provided on the clamping mechanism for retaining movement of the operating lever at least in the rotary position (at least in sections).

The retention device causes retention at least in sections of the rotary motion of the operating lever. For example, when the operating lever is in a rest position disengaged from the clamping component and is per se freely rotatable, the retention device allows defined positioning of the operating lever which is not changed automatically absent the user's intervention. Moreover, the operating lever automatically remains in the rotary position.

In preferred specific embodiments the retention device is configured to retain pivoting of the operating lever relative to the clamping component.

Preferably, the retention device is configured to retain axial movement of the operating lever relative to the clamping component. Alternately or supplementarily, it is also possible and preferred to retain rotary motion of the operating lever relative to the clamping component.

In preferred configurations, a retention device is configured as a holding device, automatically holding the operating lever in at least one rotary position and/or at least one axial position.

Preferably, the retention device comprises an elastic component disposed in a depression of at least one clamping part in the shape of an assembly or e.g. an elastic element. The elastic element may be configured as a spring element.

Preferably, the depression is configured as a peripheral groove (over the entire periphery). Alternately, it is possible for the depression to only extend in specific angular ranges or e.g. helically.

The elastic component (or the element having spring characteristics) is in particular elongated and preferably configured as a circumferential ring such as an O-ring. The elastic component or the elastic element is in particular at least partially disposed in the depression respectively in the circumferential groove (peripheral groove). The peripheral ring may be disposed in the peripheral groove and may be in frictional contact with the adjacent element. Thus, movement (axial and/or radial movement) of the two elements/components relative to one another may be retained so that the operating lever automatically remains in the position set.

In all the configurations, it is preferred to provide at least one click-in mechanism.

Preferably the click-in mechanism comprises at least two interacting click-in means.

The clamping mechanism may comprise one of the (or a first) click-in means in a peripheral groove in a first of the clamping parts, and an elastic component disposed in the peripheral groove.

Preferably, one of the (or another or a second) click-in means is comprised in a (another) peripheral groove in a second clamping part.

Preferably, the two clamping parts click into one another in at least one axial position and preferably in two different axial positions in the axial direction.

In advantageous specific embodiments, two spaced apart peripheral grooves are configured in the first clamping part. These peripheral grooves may be referred to as locking grooves and serve as second and third click-in means.

The two peripheral grooves are preferably formed on the clamping sleeve.

The elastic component preferably clicks into one of the two peripheral grooves (locking grooves) in the engagement position and in the other of the peripheral grooves (locking groove), in the rotary position.

The clamping component comprises in particular a coupling unit showing a non-round coupling contour for coupling the clamping component having an accordingly adapted connecting unit with a non-round connecting contour, to the bicycle component.

Preferably, the clamping mechanism comprises a bicycle component. This bicycle component may in particular be configured as, or comprise, a front wheel, rear wheel, seat post, or axle unit or another bicycle element. Preferably, the bicycle component is a through axle.

The click-in mechanism comprises in particular in (at least) one of the clamping parts a contact member biased by a biasing device which interacts with at least one non-round contour and preferably a polygonal contour in the other of the clamping parts. The first click-in means may in particular comprise an accommodation (e.g. bore or depression) and disposed therein, a biasing device such as a spring member and a contact member such as a ball. The contact member is biased outwardly (or inwardly) in particular by the spring member in the radial depression and is urged against a non-round and in particular e.g. polygonal contour which in an axial and/or radial movement, due to the spring force of the spring member, retains the relative motion and/or causes a locking effect. This non-round contour may be multi-angled, polygonal or toothed or show another non-round configuration.

Preferably, a non-round contour is configured as a periodic surface structure on a surface of at least one of the clamping parts. This non-round contour may in particular be configured as a toothing (internal toothing or external toothing). The non-round contour may preferably be used for non-rotatable engagement with the other of the clamping parts. Alternately, it is possible for the non-round contour to be separate and to not be used for non-rotatably coupling the clamping parts in the engaging position.

Preferably, the periodic surface structure is configured as a multi-edge profile or a toothing.

The clamping component may be provided with a periodic outer contour provided for form-fitting engagement in a periodic inner contour in the clamping sleeve when the operating lever and the clamping component are in the engagement position.

Preferably, the periodic outer contour at the clamping component is disengaged from the periodic inner contour in the clamping sleeve when the operating lever and the clamping component are in the rotary position.

Preferably the clamping sleeve surrounds the entire circumference of the periodic outer contour and the periodic inner contour in the engagement position and the rotary position. Access to the interior between the clamping sleeve and the space between the periodic outer contour and the periodic inner contour is preferably only possible through one or two (narrow) gaps.

The gap shows a maximal free dimension of less than $\frac{1}{10}$ of the outer diameter of the clamping sleeve. The gap is preferably less than 2 mm and in particular less than 1 mm. The gap may be less than 0.5 mm or 0.3 mm.

Preferably, the two axial ends each show a (narrow) radial and/or axial gap between the clamping sleeve and the clamping component or between the clamping sleeve and the clamping part of the clamping component. A (narrow) radial and/or axial gap seals the access to the engagement region between the periodic outer contour and the periodic inner contour (at least substantially). This ensures a permanently reliable function. This also renders the structure very stable.

It is possible and preferred for at least one gap to be sealed by a sealant. It is possible and preferred to provide a type of labyrinth seal configured with at least one axial and one radial gap section or gap.

In configurations in which the clamping component shows a push button attached to or configured at the axially outwardly end, it is preferred to configure a radial gap between the outer periphery of the push button and the inner wall of the clamping sleeve, extending over a given axial length. The axial length is preferably larger than a radial gap width.

Preferably, at least one gap is configured between the clamping sleeve and the clamping component to outwardly seal an internal space between the periodic inner contour and the periodic outer contour.

In particular, is the internal space sealed outwardly at least in the rest position by a labyrinth seal showing differently oriented gap sections.

In the engagement position, the contact member in particular bears against the periodic inner contour, retaining a relative motion (in particular axial relative motion) of the operating lever relative to the clamping component.

In the rotary position, the contact member preferably bears against the periodic inner contour, retaining an axial and/or radial relative motion of the operating lever relative to the clamping component. The contact member does not block relative motion but only applies a surmountable resistance.

The biasing device is in particular at least partially and preferably substantially or oriented entirely radially.

In specific configurations, the click-in mechanism biases the operating lever in the engagement position to the engagement position, urging the operating lever in particular to the engagement position. Preferably, the click-in mechanism biases the operating lever in the rotary position to the rotary position, urging the operating lever in particular to the rotary position. Thus, a transfer of the operating lever from the engagement position to the rotary position and vice versa requires overcoming the prevailing biasing force of the click-in mechanism. Changing positions requires overcoming the retention force.

In the engagement position and/or in the rotary position, the contact member preferably applies an axial force on at least one of the clamping parts. Preferably, the axial force in the engagement position acts opposite to the axial force in the rotary position.

The contact member may in particular convert a radial force of a biasing device to a force axially acting on a clamping part.

Reference is made to the fact that in the sense of the present invention "retaining" may preferably include "clicking in".

The retention device may also be referred to as an impeding device. The retention device may also be denoted a click-in mechanism, in particular if it allows clicking in in one or more different positions.

Clicking in may occur in an axial movement of the operating lever from a first to a second position. Clicking in may also occur in a pivoting/rotary motion from a first to a second position and vice versa. Any movement may be retained axially and rotatingly.

Preferably, at least one click-in mechanism is configured on the clamping mechanism for the operating lever to click into at least one of the two positions (rotary position and engagement position).

In all the configurations, the invention allows a (substantially) freely selectable orientation of the operating lever relative to the clamping component without decoupling the clamping mechanism from the axle unit. This is very advantageous, since it allows still greater ease of mounting where the operating lever is not rotated completely a number of times but the user's hand can rotate it by small angles of e.g. 30 degrees, 45 degrees or 60 degrees to then move the operating lever back from the engagement position to the rotary position from where it is once again rotated so as to further close the quick release device respectively to increase the clamping force applied.

This allows a considerably shorter design of the clamping component than it had been possible in the prior art with a removable operating lever. The operating lever or the quick release device according to the present invention does not need to be pulled out of the axle unit a certain distance for ease of mounting but it may remain pushed entirely in the axle unit until the desired clamping is applied easily and involving no risk of pinching one's fingers.

This allows to save a considerable portion of the weight of the clamping component, since the length of engagement can for example be halved compared to the prior art. Since the clamping component is as a rule made of a high-strength material and in particular of metal and preferably steel, this saves a considerable portion of the weight. The axle unit may at least partially or entirely consist of a lightweight metal and in particular of a light metal. Alternately, steel or fiber-reinforced plastic may be used.

The clamping mechanism of the present invention is suitable to mount and demount the front wheel, the rear wheel, and for example also the seat post or the saddle, if it is provided with a mounting aid matching the clamping component.

The clamping mechanism can in particular be coupled to and decoupled from the axle unit. The clamping mechanism may also comprise the axle unit.

Preferably, the clamping component comprises a coupling unit with a non-round coupling contour for coupling with a mating connecting unit having at the axle unit a connecting contour configured non-round. This means that the non-round coupling contour of the coupling unit can be coupled with the connecting contour of the axle unit that is configured non-round to selectively establish a non-rotatable connection.

In a preferred specific embodiment of the invention, the coupling unit of the clamping component is inserted into the connecting contour for mounting and demounting. It is also possible and preferred to place the coupling unit of the clamping component on the connecting contour of the connecting unit for mounting and demounting. It is also possible to insert part of the coupling unit into the connecting unit for mounting and/or demounting while another part of the coupling unit is pushed or applied onto another part of the connecting unit. Preferably, one of the two parts to be coupled with one another is configured "male" and the other coupling part is configured "female" so as to obtain an exactly fitting and non-rotatable coupling.

In a preferred configuration, the coupling unit shows an outer polygon and/or inner polygon. The coupling unit may for example comprise an outer multi-edge profile and/or an inner multi-edge profile to establish an exactly fitting and non-rotatable coupling with the connecting unit.

It is advantageous to provide at least one click-in unit for clicking the clamping component into the axle unit. This is to ensure accommodation of the clamping component on the axle unit that is at least substantially secure against loss. Absent extraordinary external forces, this click-in unit offers secure protection against loss. The click-in unit may comprise multiple click-in elements to allow clicking-in in different rotary positions.

It is advantageous for the operating lever to be moved from the rotary position to the engagement position by way of axial movement away from the clamping component. An inadvertent rotary motion of the operating lever has no effect on the clamping force.

In preferred embodiments, the operating lever is biased toward the clamping component by means of a biasing device. This biasing device may comprise a coil spring or multiple coil springs or other spring types. Biasing by way of magnetic or other forces is likewise possible. Biasing the operating lever in the direction toward the clamping component and thus to the rotary position ensures that the user cannot for example inadvertently increase the clamping force or release the quick release device directly when gripping the operating lever. The bias to the rotary position leaves the clamping force unchanged in the case of inadvertent contact with the operating lever. To ensure a defined angular position of the operating lever in this configuration as well, free rotational movement of the operating lever may be impeded by way of friction or the like so that a rotary position and (optionally) axial position once set is maintained. It is also possible for the operating lever to be configured for clicking in in one rotary position or in a specified number of rotary positions.

In advantageous configurations, the clamping component shows at one of its ends the coupling unit for coupling with the axle unit, and at one or the other of its ends, an in particular mushroom-shaped push button. The push button is preferably provided with a circumferential collar. The circumferential collar may comprise gaps.

In a preferred configuration, the operating lever is coupled with the axle unit via a torque limiter in the engagement position. This torque limiter serves to limit the maximum torque of the operating lever to avoid too high clamping forces acting on the quick release device. The torque limiter may be configured as it is usual and disclosed in the prior art. The transmitted torque may be adjustable or fixedly preset.

In all the configurations, it is preferred for the axle unit to be configured hollow at least at the second end. It is possible and preferred for the axle of the axle unit to comprise a continuous opening in its interior.

Preferably, the axle unit comprises an external thread at the second end to provide a fastener. Alternately, it is possible for the fastener to comprise a bayonet joint which enables fixed accommodation on the frame of a two-wheeled vehicle in one angular position while in another angular position the bayonet joint may e.g. be removable from the frame of the two-wheeled vehicle. Such a bayonet joint may be configured e.g. in the shape of a key/keyhole, interacting with the mating design of the frame.

In all the configurations, it is preferred that both the operating lever and the clamping component show non-round, mating engagement contours which are engaged with one another in the engagement position. Since the engagement contours of the operating lever and the clamping component only overlap over a certain axial width, the engagement contours can be disengaged by way of relative axial displacement of the operating lever so that the operating lever is brought to the rotary position where it can freely rotate in both rotational directions.

The non-round engagement contours or coupling contours at the operating lever and the clamping component may be configured for example in the shape of toothings. Configurations with outer and inner polygons or with outer and inner multi-edge surfaces are preferred. Radial toothing at the operating lever and the clamping component is particularly preferred, wherein the operating lever preferably comprises a radial internal toothing and the clamping component comprises a radial external toothing. It is also possible for the operating lever to be in engagement with the clamping component by way of axial toothing serving as engagement contours.

The operating lever preferably comprises, or is fixedly connected with, a clamping sleeve wherein the clamping sleeve is preferably provided with the non-round engagement contour.

In all the configurations, the ratio of a length of overlap of the coupling unit in engagement with the connecting unit relative to a diameter of the coupling unit, is preferably less than 4:1 and preferably less than 3:1, and it may in particular be less than 2:1. Particularly preferably, the ratio of the portion of the clamping component respectively of the coupling unit that can be inserted into a connecting unit, to the diameter of the portion of the clamping component that can be inserted, is less than 4:1 and preferably less than 3:1, if the coupling unit of the clamping component is configured as a "male part". Given a coupling unit of the clamping component configured as a "female part" then a length of the insertable portion of the connecting unit is less than four times, and in particular less than three times, its diameter.

A two-wheeled vehicle according to the invention comprises a frame, a fork, an at least partially muscle-powered drive, and two wheels, a front wheel and a rear wheel. Each wheel comprises a hub and a pertaining axle unit. A clamping mechanism and/or a quick release device is provided as is described above.

The two-wheeled vehicle according to the invention also has many advantages. Operating the clamping mechanism is easier and inadvertent release is prevented. The two-wheeled vehicle may be provided with a reduced total weight on the whole since using the clamping mechanism allows to save weight overall. At the same time, simple operation is enabled.

It is possible for a clamping mechanism to be releasably attached to the axle unit of the rear wheel. Then, the front wheel may be not provided with a clamping mechanism. This achieves improved aerodynamics, since an operating lever protruding outwardly at the front wheel would interfere with aerodynamics. At the same time, the total weight is reduced and simpler operation is enabled. It is also possible to provide two clamping mechanisms each having an enveloped axle unit.

On the whole, the invention allows a reliable operation and a simple structure of a clamping mechanism and a quick release device.

Disposing only one removable clamping mechanism with the operating lever at the rear wheel improves the optical appearance and in particular the aerodynamics. The costs can be reduced since only one single lever is employed for the entire bicycle. The clamping mechanism may serve not only to mount the wheels but for example also to clamp the saddle.

Using clamping mechanisms with fixedly incorporated axle units reduces the risk of theft of the clamping mechanism and also the risk of losing the clamping mechanism. Also, the clamping mechanism cannot be simply "forgotten" but it is always present.

Employing a conventional inner multi-edge profile or the like at the interface between the clamping component and the axle unit then allows a mechanic, for example during a race, to quickly and safely remove and attach the wheel by means of a screwdriver (e.g. power-operated). While waiting for the service mechanic the rider may still use the time to start releasing the wheel.

All of the configurations also offer the considerable advantage that the angle of orientation of the operating lever is independent of the angle between the clamping component and the axle unit. For example, if a square or hexagon is provided for the coupling unit of the clamping component and the connecting unit of the axle unit (one male part and a mating female part), then the clamping component can be placed in exactly four or six different angular positions. With the present invention, the orientation angle may also be adjusted by way of the relative angular position of the engagement contours of the operating lever relative to those of the clamping component. When toothings are employed having 12 and in particular at least 18 and preferably 24 teeth or more (or rounded projections protruding outwardly or inwardly), then the operating lever can be placed in a multitude of positions. Then, the desired angle of rotation can be adjusted to match the fork or the dropouts.

Further advantages and features of the present invention can be taken from the exemplary embodiments which will be described below with reference to the enclosed figures.

DETAILED DESCRIPTION

Figure 1:
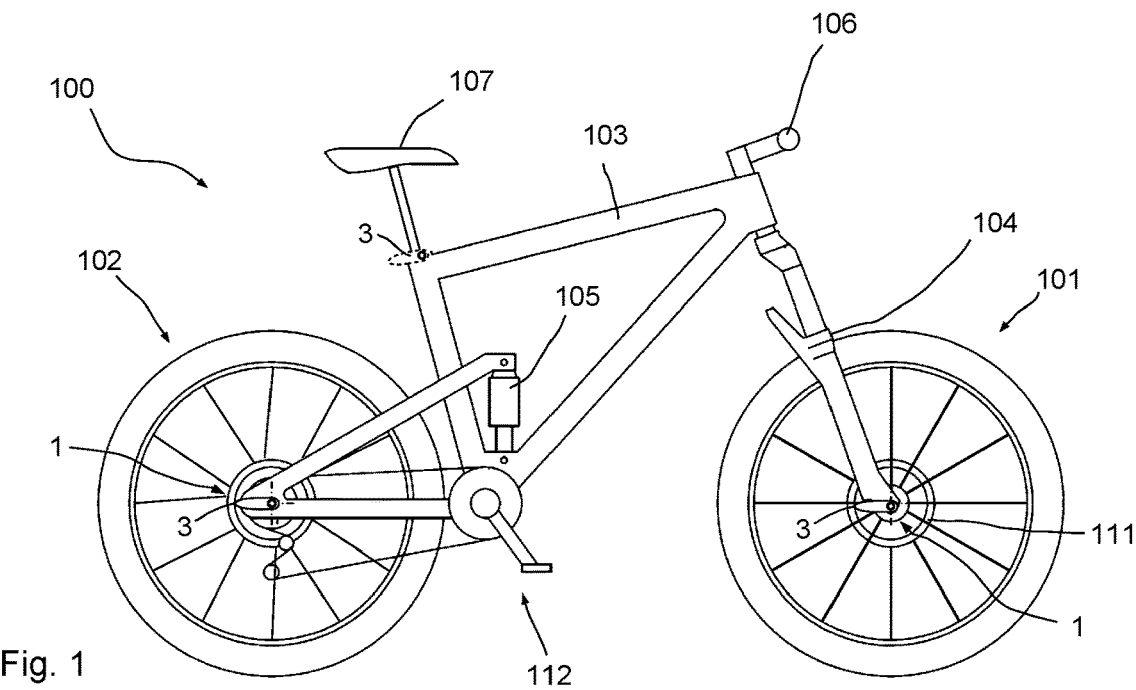
FIG. 1 a schematic side view of a mountain bike.

FIG. 1 shows a schematic illustration of a mountain bike representing the bicycle or two-wheeled vehicle 100. The bicycle comprises a front wheel 101, a rear wheel 102, a frame 103, a suspension fork 104, a rear wheel damper 105, a handlebar 106, and a saddle 107. The drive 112 is provided by means of pedals and in this case, a chain shifting device respectively derailleur. The front wheel 101 and the rear wheel 102 are each attached to the fork 104 respectively the frame 103 by means of a quick release device 1. The quick release device 1 comprises a clamping mechanism 3 shown in a dotted line at the seat post of the saddle 107, which may also be used to adjust the saddle height.

Figure 2:
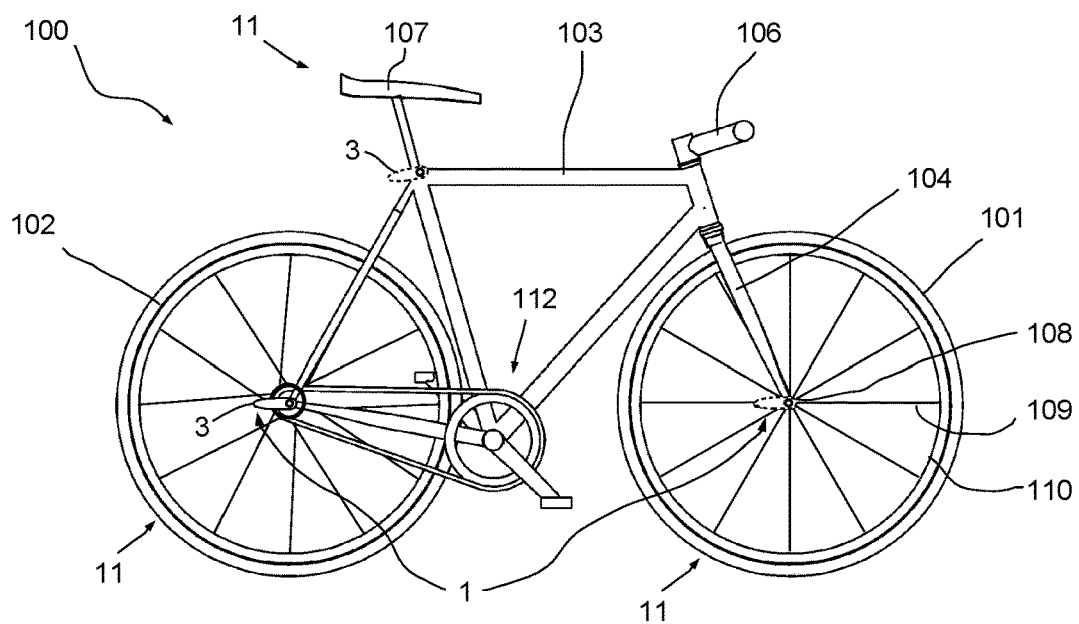
FIG. 2 a schematic side view of a racing bicycle or a roadster.

FIG. 2 shows a simplistic side view of a racing bicycle or roadster representing a two-wheeled vehicle 100, wherein the bicycle again comprises a front wheel 101 and a rear wheel 102 which are fastened to the fork 104 respectively the frame 103. Both the front wheel and the rear wheel 101, 102 comprise spokes 109 and a rim 110. A disk brake 111 (see FIG. 1) may, but does not have to, be provided. In this case a quick release device 1 is shown at the rear wheel, including a clamping mechanism 3. This clamping mechanism 3 of the quick release device 1 can be removed from the rear wheel 102 and applied to the front wheel 101, as FIG. 2 shows in a dotted line, for mounting and optionally demounting the front wheel as well. The clamping mechanism 3 may also serve to adjust the height of the saddle 107 or the seat post. In this respect, the front wheel 101, the rear wheel 102, the saddle and the seat post may also be referred to as bicycle components 11. It is also possible for the clamping mechanisms 3 to be configured as complete quick releases or e.g. to comprise a through axle fixedly mounted thereon.

At any rate, the two-wheeled vehicle 100 illustrated in FIG. 2 achieves an optically pleasant appearance since the operating lever of the quick release device 1 is only provided at the rear wheel. In the operational state shown the front wheel 101 is not provided with a clamping mechanism 3 with a pertaining operating lever. The same applies to the attachment of the seat post. When required, the clamping mechanism 3 may be released from the rear wheel by means of the operating lever and used for mounting and demounting the front wheel or the seat post or further bicycle components 11. Preferably, the clamping mechanism 3 is accommodated on the rear wheel 102 secure against loss while it is not in use. Alternately, it is possible to store or attach the clamping mechanism 3 at respectively to the front wheel 101.

With reference to the FIGS. 3 to 5, a first exemplary embodiment of a quick release device 1 according to the invention or a clamping mechanism 3 according to the invention will now be discussed.

Figure 3:
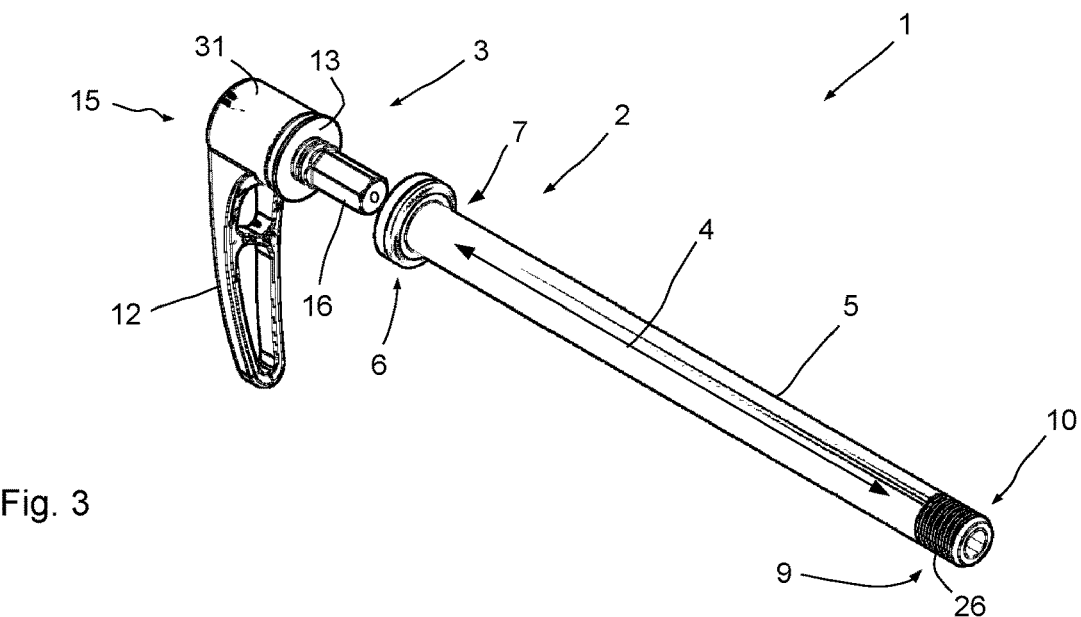
FIG. 3 an overall view of a quick release device according to the invention.

FIG. 3 shows a perspective overall view of a quick release device 1 according to the invention prior to inserting the clamping mechanism 3 in the axle unit 2 which is the bicycle component 11. Thus, the coupling unit 16 of the clamping mechanism 3 is recognizable in FIG. 3. The axle unit 2 comprises the axle 5, which in this case is configured as a through axle, extending in the axial direction 4. The first end 7 of the axle 5 is provided with a locking means 6, while the second end 10 of the axle 5 is provided with a fastener 9. The fastener 9 in this exemplary embodiment is configured as an external thread 26 on the axle 5. In this exemplary embodiment the axle unit 2 is inserted through the dropouts and the hub of a wheel and the axle unit 2 is fastened to the frame 103 by means of the clamping mechanism 3 so that the hub 108 is clamped between the dropouts of the frame 103 or in the fork 104.

The clamping mechanism 3, which comprises a clamping component 13 and fastened thereto an operating lever 12, serves for operation. After inserting the coupling unit 16 of the clamping mechanism 3 into the connecting unit 17 (see FIG. 5) of the axle unit 2, the coupling unit 16 is non-rotatably coupled with the axle unit 2. FIG. 3 illustrates the rotary position 15. A rotary motion of the operating lever 12 does not change the tension in this position. Only after defined retracting will a rotary motion result in a coupled rotary motion of the axle unit 2 and the axle 5 and thus also of the external thread 26 of the axle unit 2.

The function of the clamping mechanism 3 according to the invention according to FIG. 3 will now be discussed with reference to the FIGS. 4a and 4b.

Figure 4A:
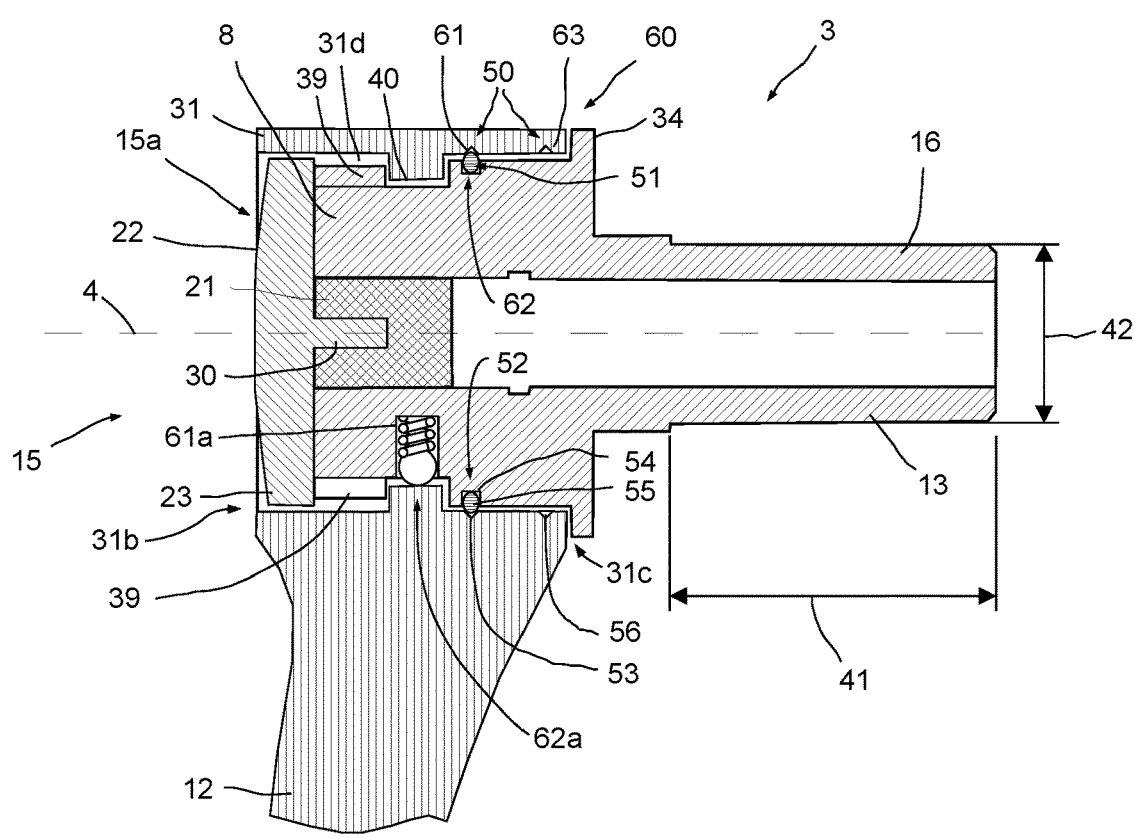
FIG. 4*a* an enlarged section of the clamping mechanism according to FIG. 3.
Figure 4B:
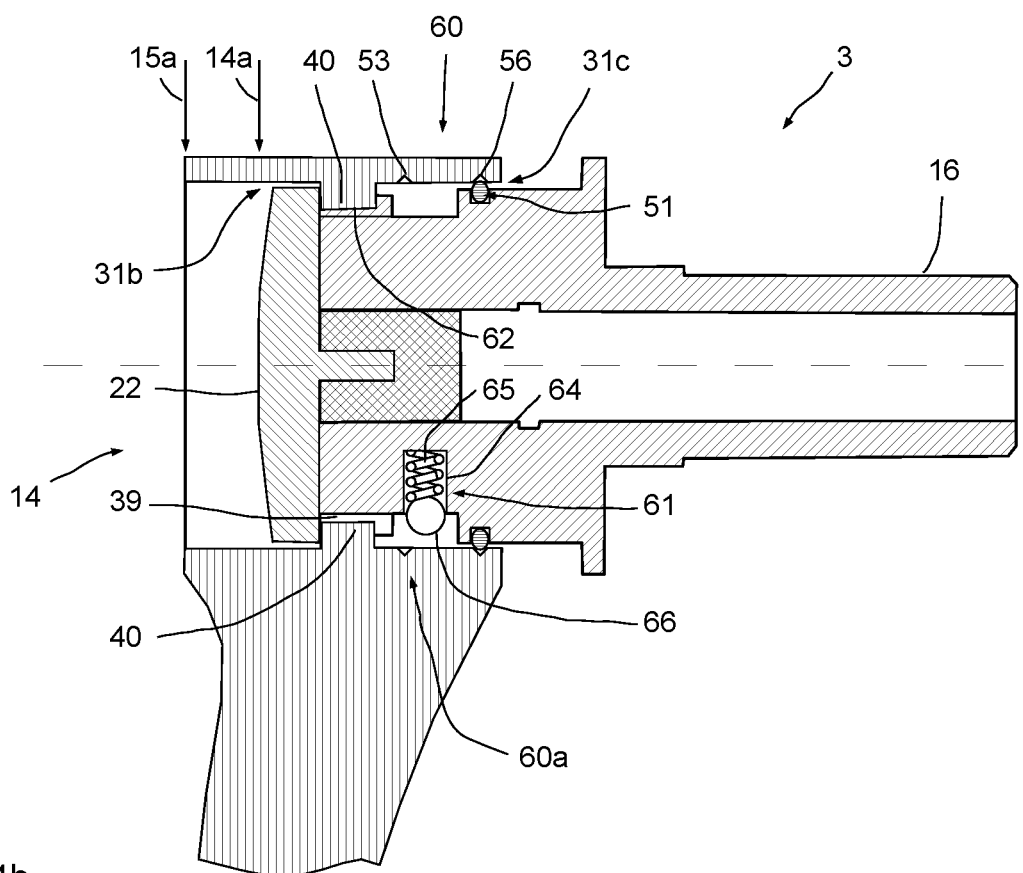
FIG. 4*b* an enlarged section of the clamping mechanism according to FIG. 3.

FIGS. 4a and 4b show another exemplary embodiment of a clamping mechanism according to the invention.

The embodiment according to FIGS. 4a and 4b provides for a retention device 50 which also serves as a click-in mechanism 60. The click-in mechanism 60 comprises two axially spaced apart peripheral grooves 53 and 56 as first and third click-in means 61 and 63. The peripheral grooves 53 and 56 may show any desired cross-section, in particular triangular or rectangular or oval. The second click-in means is formed by a peripheral groove 54 in the clamping part 8 (clamping component 13) and an elastic component 51 disposed therein, which presently is an O-ring 55. The O-ring 55 may click into both the one and the other of the peripheral grooves 53 and 56 so as to enable locking in the engaging position 14 (FIG. 4b) and also in the axially offset rotary position 15 (FIG. 4a). The O-ring 55 retains an axial movement of the operating lever.

In the rotary position 15, the O-ring 55 retains a rotary motion of the operating lever 12. When in the rotary position 15, the O-ring 55 is located in the peripheral grooves 53 and 52. A rotary motion, although retained by the frictional contact, is possible in both rotational directions. After releasing, the operating lever 12 remains automatically and permanently in the selected rotary position 15. The operating lever 12 is retained in this rotary position by the retention device 50. Only as the user overcomes the retaining force can the user rotate the operating lever. Selecting the gap dimensions and the dimensions of the peripheral grooves and of the material of the elastic ring 55 and selecting the dimensions of the elastic ring 55 allows to set and adjust a suitable or desired retention or holding force.

Additionally or instead, a (second) click-in mechanism 60a may be provided having at least one biasing device 65 received in an accommodation 64 which urges a contact member 66 radially outwardly. This click-in means 61a (the accommodation 64 and the biasing device 65 and the contact member 66) then cooperates, causing snap-in in a rotary motion of the operating lever 12 in the rotary position 15 with the internal toothing 40. This configuration is possible in all the exemplary embodiments. A radially reversed effect is also possible. Alternately, this click-in means 61a, which in particular consists of a biasing device 65 and a ball 66 in a depression 64, is omitted. Absent a click-in means 61a, the entire click-in mechanism 60a is omitted.

Then, however, the retention device 50, which also serves as a click-in mechanism 60, may act. This configuration allows a particularly simple structure. Then, the retaining effect during rotary motion is not based on the locking effect of the ball acting as a contact member 66 on a toothing but is based on the frictional effect of the elastic ring 55 (in particular an O-ring) in the grooves 53 and 56.

The rotary position 15 is illustrated in FIG. 4*a*, into which the operating lever 12 is pushed to be flush with or up to the stopper.

In FIG. 4*b*, the operating lever is retracted and in the engagement position 14. In this engagement position 14 the non-round inner contour or internal toothing 40 engages in the non-round outer contour or external toothing 39.

Figure 5:
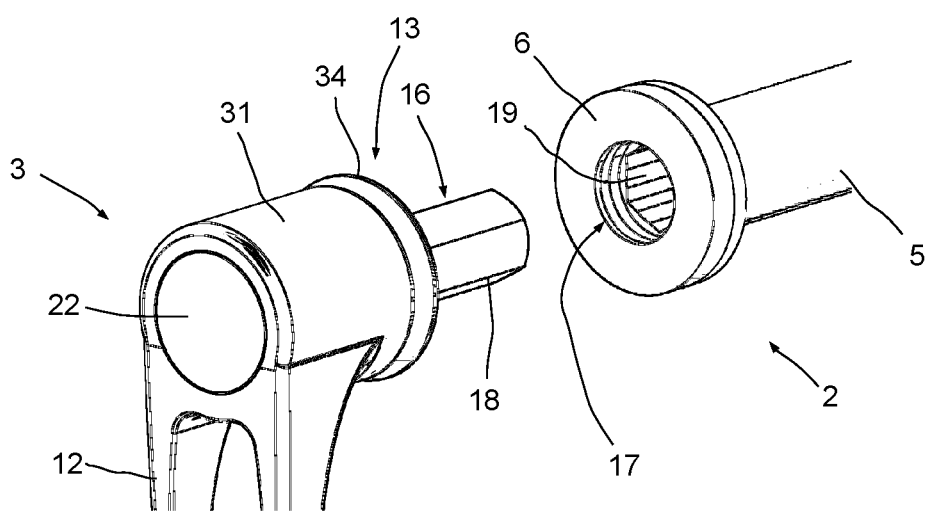
FIG. 5 a perspective view of the quick release device according to FIG. 3.

A matching axle unit 2 comprises in its interior a connecting unit 17 having a non-round connecting contour 19 (see FIG. 5).

The clamping mechanism 3 is substantially formed by the clamping component 13 and the operating lever 12. This operating lever 12 comprises a clamping sleeve 31 which presently is integral, one-piece, from which the handle of the operating lever extends radially outwardly.

The interior of the clamping component 13 may, e.g. show a lightweight material, screwed-in and/or glued in plug 21 or the like. The plug 21 may be integrally formed with a push button 22 or the push button 22 is screwed into the plug 22 by way of the thread 30 and/or glued in etc. The push button 22 may show a mushroom shape. The push button 22 may comprise at its outwardly end a radially protruding collar 23.

In FIG. 4*a*, the operating lever 12 is in the rotary position 15. The clamping components 13 and 31 each show non-round contours which may be coupled with one another. In the engagement position 14 shown in FIG. 4*b*, the external toothing 39 of the clamping component 13 and the internal toothing 40 of the clamping sleeve 31 are in engagement with one another by way of their non-round contours so that in the illustration of FIG. 4*b* the operating lever 12 is non-rotatably coupled with the clamping component 13.

The contacting disk 34, which when mounted bears against the axially outwardly face of the locking means 6, serves to bear against and to better guide the clamping mechanism 3 on the axle unit 2.

To accommodate the clamping mechanism 3 secure against loss on the axle unit 2 when mounted, an O-ring 38 may be provided in the interior of the connecting unit 17 of the locking means 6.

To transfer the operating lever 12 from the rotary position 15 to the engagement position 14, the operating lever 12 is moved axially outwardly away from the axle unit 2 in the axial direction 4.

The clamping mechanism 3 comprises two clamping parts, the clamping part 8 configured on the clamping component, and the clamping sleeve 31 which serves as another clamping part. In the engagement position 14, the clamping parts 8 and 31 are non-rotatably coupled.

In the exemplary embodiment according to the FIGS. 4*a* and 4*b*, a retention device 50 is provided. This retention device 50 comprises at least one click-in mechanism 60 and retains a relative motion of the operating lever relative to the clamping component 13. The click-in mechanism 60 locks the operating lever in two axial positions 14*a* and 15*a*.

This click-in mechanism 60 comprises a first click-in means 61 and two further click-in means 62 and 63. The click-in means 61 comprises an accommodation 64 which may be formed e.g. as a cylindrical hole. The accommodation 64 extends in the radial direction from the outer surface of the clamping component radially into the clamping component 13. Disposed in the accommodation 64 is a biasing device 65 which may be formed e.g. as a coil spring or other (spring component) elastic component 51. Alternately, other springing elements e.g. on a magnetic or other basis may be used. The biasing device 65 urges a contact member 66 radially outwardly. The contact member 66 may e.g. be a ball or it may be oval. It is also possible for the contact member 66 to show lateral slopes.

It is possible and preferred to provide one click-in means 61 only with a biasing device 65 disposed in an accommodation 64 and a contact member 66 interacting therewith. Alternately, it is possible to have two or more (in particular identical) click-in means 61 and 61*a* configured on one of the clamping parts. Therefore, a second click-in means 61*a* may be provided which may be disposed offset by a suitable angle of e.g. 180° to the click-in means 61.

When the operating lever 12 is pulled outwardly applying a force exceeding the force of the biasing device 65 acting in the axial direction, the operating lever 12 is transferred to the engagement position 14 illustrated in FIG. 4*b*.

FIG. 4*b* shows a schematic sectional view of the clamping mechanism 3 in the engagement position 14. The operating lever 12 has been in particular pulled axially outwardly by means of the clamping sleeve 31 until the axially outwardly end of the internal toothing bears closely against the push button 22 (a slight gap is shown for better visibility). In the illustrated engagement position 14 the internal toothing 40 as a non-round contour 43 on the clamping sleeve 31 and the external toothing 39 on the clamping component are in engagement so as to prohibit free rotary motion. In the rotary position 15 according to FIG. 4*a*, an actually free rotary motion of the operating lever 12 is possible in both rotational directions.

With an axial movement of the operating lever 12, the user may employ the push button 22 as a counter bearing to the force applied on the operating lever 12. This means that the user supports for example his thumb on the outside of the push button 22 to pull the operating lever 12 axially outwardly to the engagement position 14. After tightening or releasing the wheel the user may shift the operating lever 12 back axially inwardly to then rotate it to the desired (rest) position.

Although in the rotary position 15 free rotary motion is possible in both rotational directions, the retention device 50 retains such motion. A transfer of the operating lever 12 to the engagement position 14 is retained as well. This is advantageous since the operating lever 12 remains in the rotary position or in the engaging position without any assistance even after releasing.

In this exemplary embodiment, the operating lever 12 may click in in two axial positions and when in the rotary position 15 a rotary motion thereof is additionally retained.

It is possible that in the rotary position 15 the other (axially inwardly) flank of the internal toothing 40 acting as click-in means 63 and the click-in means 61 cooperate with the contact member 66, retaining axial movement of the operating lever 12. A radial force of the compressed biasing device (in particular a coil spring) is diverted to an axial force. For a rotary motion of the operating lever, the contact member 66 must also be urged back for each single tooth of the internal toothing 40 so that a rotary motion is also retained and ratcheted.

In this case and preferably also in all the exemplary embodiments having a removable clamping mechanism 3, a ratio of a length of overlap 41 of the coupling unit 16 in engagement with one another and the connecting unit 17 relative to a diameter 42 of the coupling unit 16, is preferably less than 4:1 and preferably less than 3:1 and it may in particular be less than 2:1.

The FIGS. 4a and 4b show, representatively for all the exemplary embodiments, gaps 31b and 31c formed between the clamping component 13 and the clamping sleeve 31. The gap 31b is provided at the axially outwardly end and the gap 31c, at the axially inwardly end. The gaps 31b and 31c seal the internal space 31d between the clamping component 13 and the clamping sleeve 31 outwardly.

This gap 31b is formed as a radial gap and extends over an axial length that is considerably larger than is the radially free extension. This gap 31b is formed between the push button 22 and the inner wall of the clamping sleeve 31.

This axially farther inwardly gap 31c comprises a radial gap between the clamping sleeve and the clamping component 13. In the normal state an axial gap follows that is formed between the axially inwardly end of the clamping sleeve 31 and the contacting disk. This forms a type of labyrinth seal in the normal rest position at the axially inwardly end of the clamping component 13. Additional sealing may optionally be provided by a sealant such as an elastic component 51.

This operating lever is aligned orthogonally to (a longitudinal extension of) the clamping component extending in the axial direction. The operating lever 12 is disposed at the same defined angle to the clamping component 13 both in the rotary position and in the engagement position.

This operating lever 12 is approximately straight and may be slightly arcuate.

In the rotary position, the operating lever 12 is on the whole disposed over its entire length closer to the clamping component 13 than in the engagement position. In the engagement position 14, the operating lever 12 is on the whole disposed over its entire length farther away from the clamping component 13 than in the rotary position 15. This achieves a stable structure.

The further exemplary embodiments may show functional principles in their interiors as in the FIGS. 4a and 4b or as is shown in the FIGS. 13a to 13d or as is discussed with reference thereto.

FIG. 5 shows a perspective illustration of a clamping mechanism 3 wherein the connecting unit 17 with the inner connecting contour 19 at the axle unit 2 is recognizable. The coupling unit 16 comprises an external coupling contour 18 mating with the connecting contour 19 of the connecting unit 17. The coupling unit 16 and the connecting unit 17 are respectively configured as an external hexagon and internal hexagon.

Figure 6:
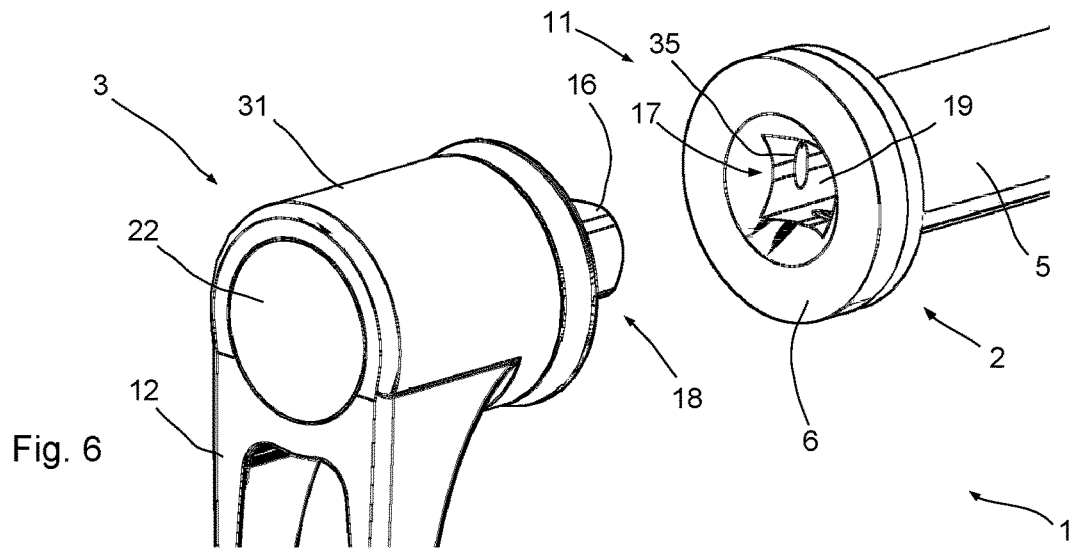
FIG. 6 a first, perspective view of another quick release device.

FIG. 6 shows another exemplary embodiment with a removable clamping mechanism 3. The clamping mechanism 3 may comprise the separate axle unit 2. Together these two also form a quick release device 1.

The coupling contour 18 of the coupling unit 16 is configured as an external square while the axle unit 2 is provided with a corresponding connecting contour 19 of the connecting unit 17 to accommodate the square of the coupling unit 16 in an accurate fit.

In addition, the axle unit 2 is provided with multiple click-in recesses 35 or indexing holes which are part of a click-in unit 20. These serve for fixing the clamping mechanism 3 (secure against loss) on a bicycle component 11 and e.g. on the axle 5.

Figure 7:
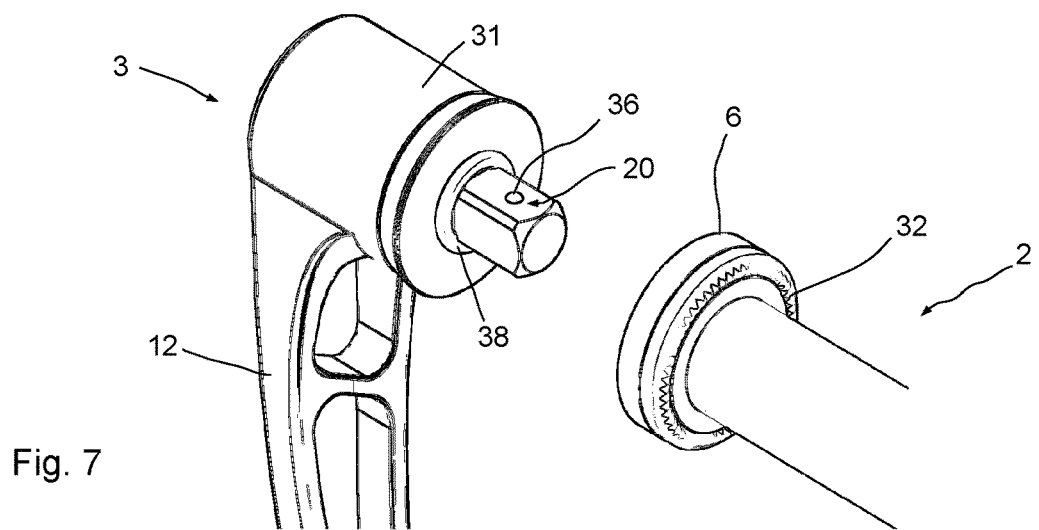
FIG. 7 another perspective view of the quick release device according to FIG. 6.

FIG. 7 shows another perspective illustration of the quick release device 1 according to FIG. 6, wherein the snap-in projection 36 of the click-in unit 20 at the coupling unit 16 can be seen. The snap-in projection 36 is spring-biased to the position shown, and serves to click into the click recess 35 in the connecting unit 17. An O-ring 38 is provided at the transition between the contacting disk 34 and the coupling unit 16.

The locking means 6 is provided with a knurled disk 32.

Figure 8:
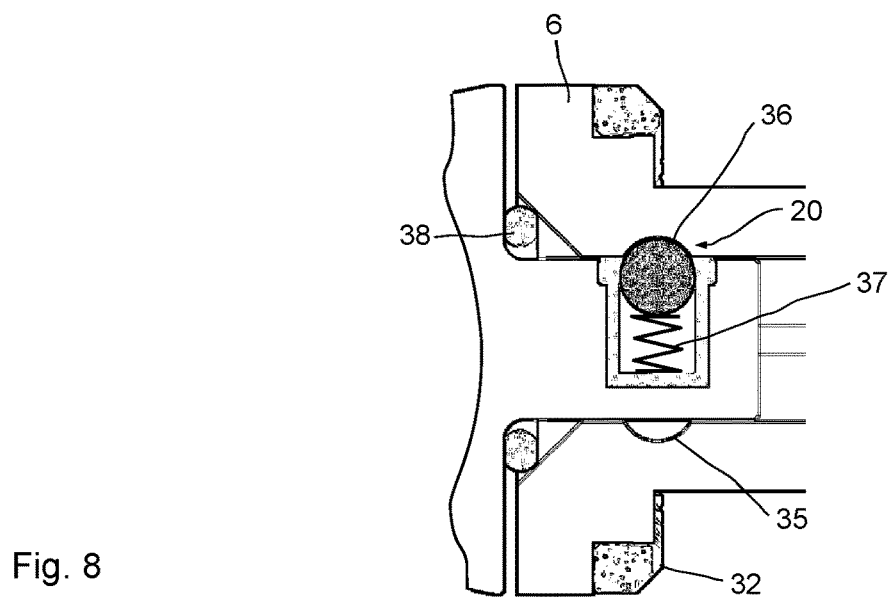
FIG. 8 a schematic section of the quick release device according to FIG. 6 in the assembled state.

FIG. 8 shows a schematic cross section of the clamping mechanism 3 respectively quick release device 1 according to FIG. 6 in the assembled state. The snap-in projection 36 is formed by a ball which is biased by a stop spring 37 to the position shown. The ball and thus the snap-in projection 36 engages in one of the click recesses 35 provided, presently four. A result of this is that the quick release device 1 is reliably retained on the axle unit 2. A corresponding spring force allows to set the retaining force. Basically, a retention device 50 or a click-in mechanism 60 may be identical in its interior with the click-in unit 20, showing identical or like parts.

Figure 9:
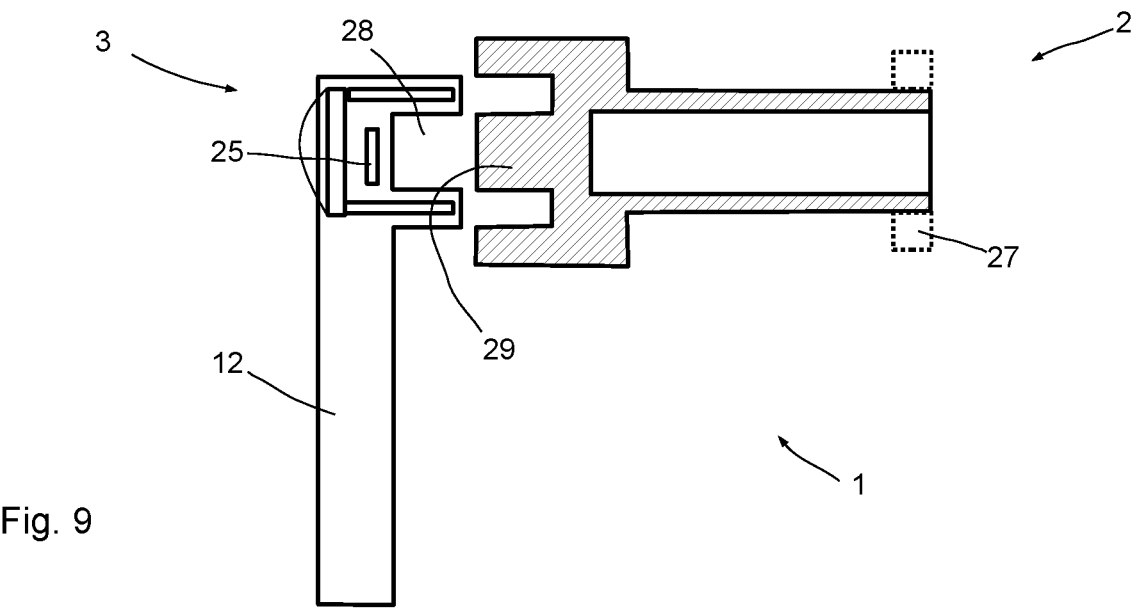
FIG. 9 a schematic sectional view of another quick release device.
Figure 10:
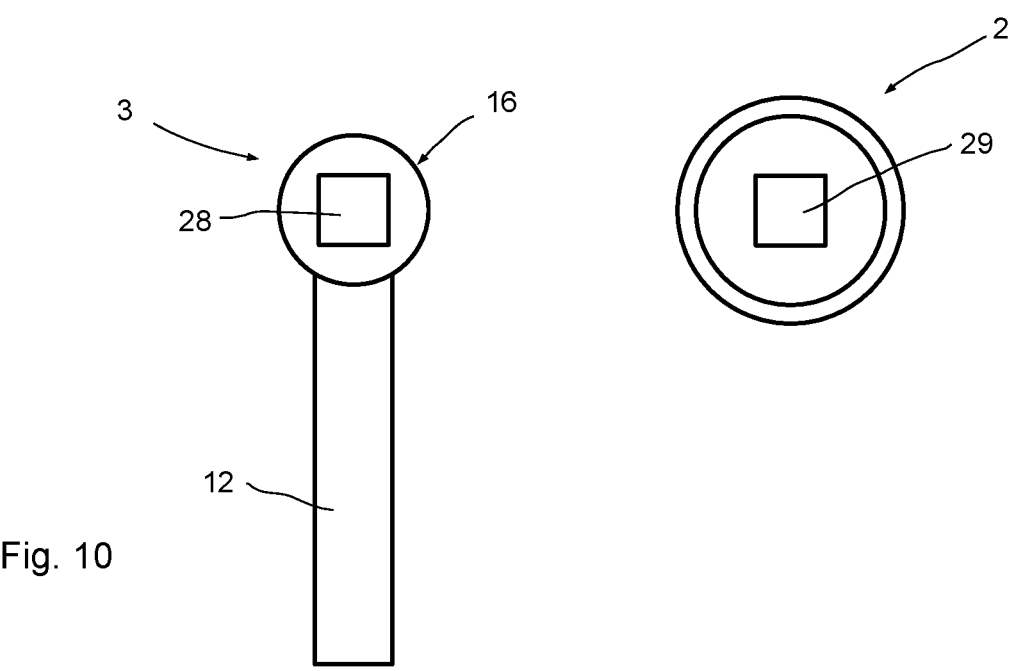
FIG. 10 a front view of the components of the quick release device according to FIG. 9.

FIGS. 9 and 10 show another simplistic exemplary embodiment of another clamping mechanism 3 according to the invention with the function of the retention device 50, which is again invisible from the outside, and/or the click-in mechanism 60 preferably being the same as described above or with reference to the FIGS. 13a to 13d. The clamping mechanism 3 is illustrated on the left while the pertaining axle unit 2 is schematically illustrated on the right.

FIG. 10 shows the front views of the clamping mechanism 3 and the axle unit 2. This connecting unit 17 forms a "male" connecting contour 29 which can engage in a "female" coupling contour 28 of the coupling unit 16. While it can be seen in FIG. 10 that the connecting contour 29 is configured as a square, it may also be a hexagon or show another toothing which interacts with a corresponding or suitable toothing or the like of the coupling unit 16.

In addition, a torque limiter 25 is provided to prevent exceeding a specified torque during mounting. It can thus be ensured that mounting by means of the operating lever 12 will always apply (maximally) the specified torque and not exceed it.

Figure 11:
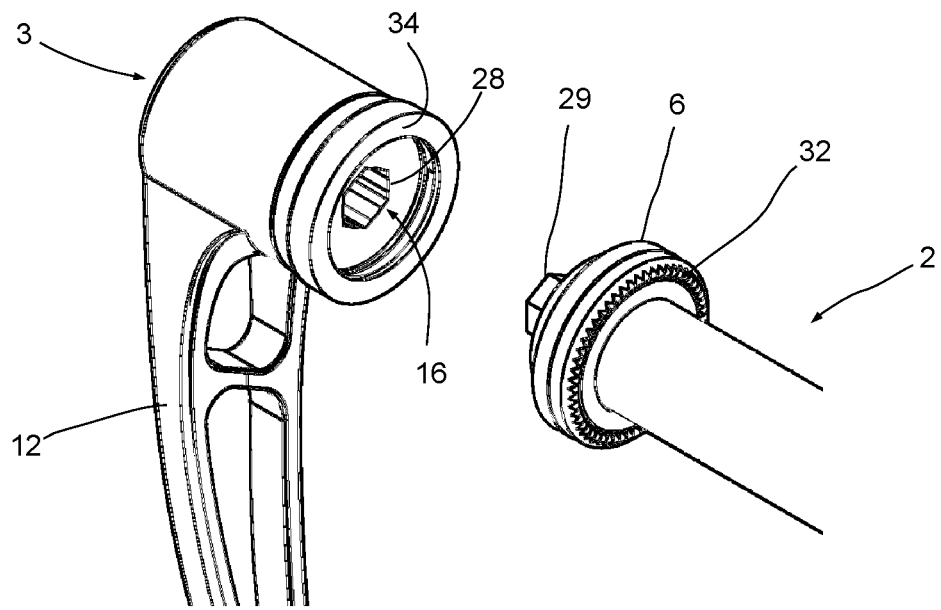
FIG. 11 yet another perspective illustration of a quick release device according to the invention.

FIG. 11 shows a schematic, perspective view of another exemplary embodiment of a quick release device and clamping mechanism 3 according to the invention wherein the male connecting contour 29 of the connecting unit 17 projects outwardly from the axle unit 2. Accordingly, a coupling unit 16 is provided with a female coupling contour 28 in which the connecting contour 29 of the connecting unit 17 engages for example when mounting or demounting a wheel. Again, a retention device 50 and/or a clamping mechanism 60 is present in the interior of the clamping mechanism 3.

Figure 12:
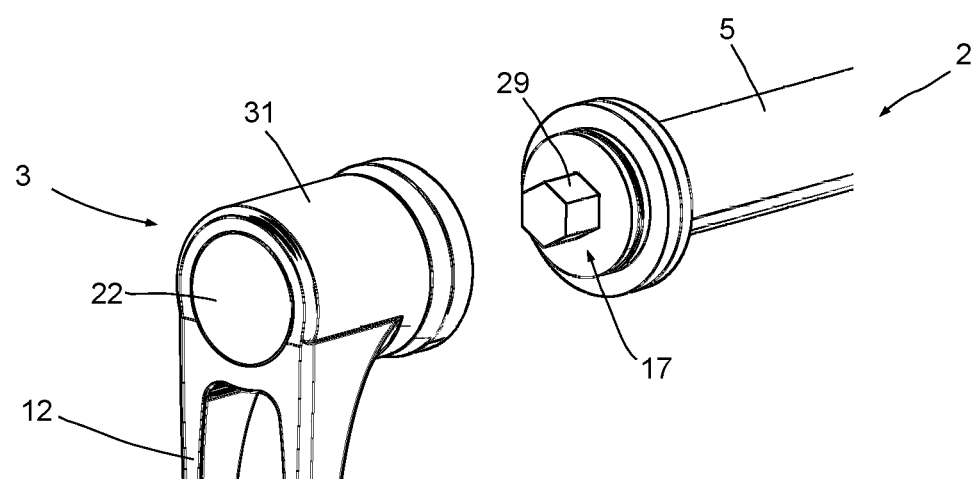
FIG. 12 another perspective illustration of the quick release device according to FIG. 11.

FIG. 12 shows a schematic, perspective illustration from the other side wherein the connecting unit 17 can be clearly seen with the connecting contour 29 which is presently male.

FIGS. 13a to 13d show another exemplary embodiment of a clamping mechanism 3 according to the invention.

This clamping mechanism 3 comprises, other than the clamping component 13 and the clamping sleeve 31 with the operating lever, also an axle unit 2, which is presently a through axle. The axle unit 2 is fixedly, and in normal operation non-releasably, connected with the clamping component 13.

In this exemplary embodiment the operating lever is again disposed (axially) closer to the clamping component 13 or the axle unit 2 in the rotary position than in the engagement position.

Figure 13A:
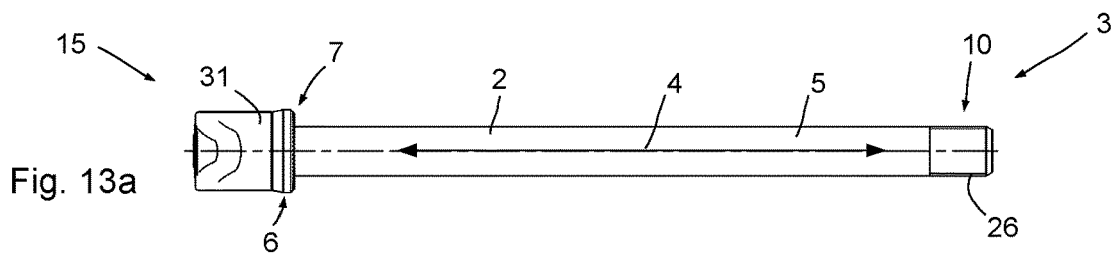
FIG. 13*a* a top view of another clamping mechanism.
Figure 13B:
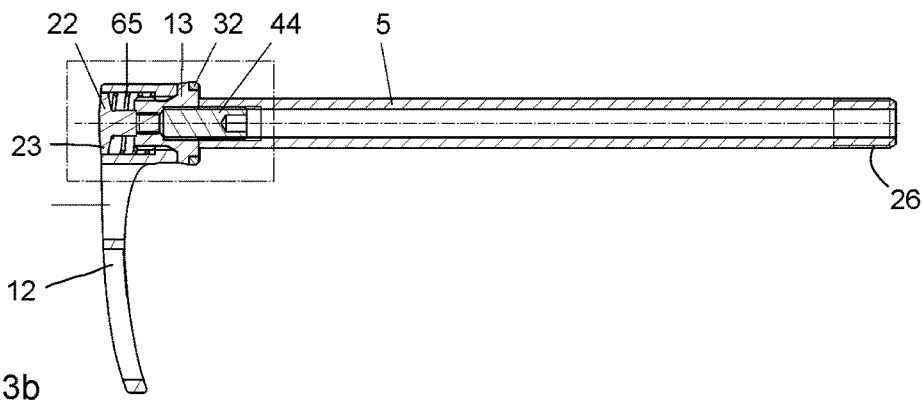
FIG. 13*b* a section of the clamping mechanism according to FIG. 13*a* in a rotary position.

FIG. 13a shows a top view in which the operating lever is hidden beneath the clamping sleeve and thus not visible. FIG. 13b illustrates a sectional view rotated 90°.

Figure 13C:
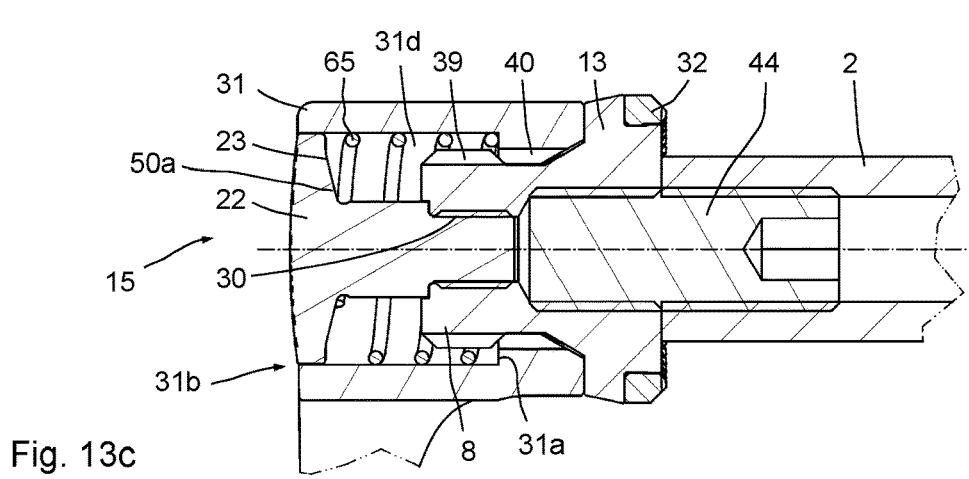
FIG. 13c an enlarged detail from FIG. 13b in the rotary position.
Figure 13D:
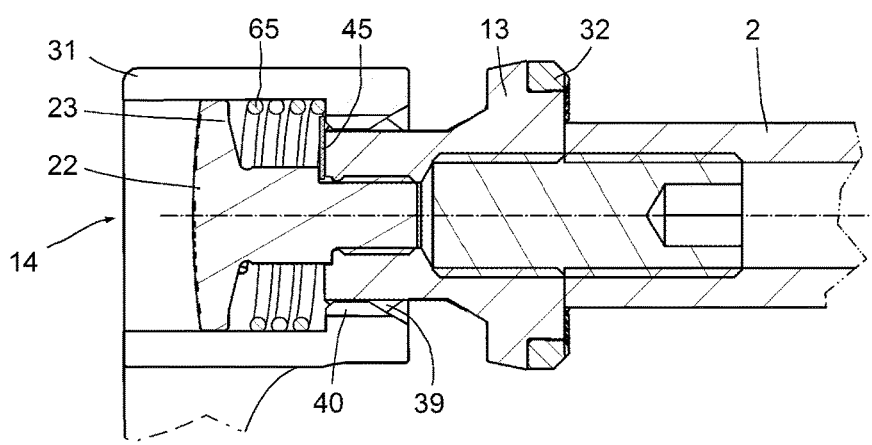
FIG. 13d the detail of FIG. 13c in the engaging position.

FIGS. 13c and 13d show enlarged sections in the rotary position and the engagement position.

This clamping mechanism 3 is shown as a complete quick release device 1, comprising a through axle 2 threaded at the second end as a fastener. A locking means is disposed at the first end 7. The through axle 5 and the clamping component 13 extend in the axial direction 4.

The axially outwardly end of the clamping component 13 shows a push button 22 screwed thereon and having an enlarged collar. A coil spring 65 acting as a biasing device is disposed between the collar and a peripheral radial shoulder in the clamping sleeve 31 to bias the clamping mechanism 3 to the rotary position 15. As the operating lever 12 rotates, the coil spring retains the rotary motion. The coil spring twists and/or rubs at its ends. This effectively prohibits automatic movement of the operating lever 12. Proper motion due to vibrations or shocks can also be reliably prevented. However, if the user gets stuck by the operating lever 12 or if his foot hits it, then the angular position of the operating lever 12 will shift but the clamping of the wheel does not change.

In the exemplary embodiment according to FIG. 13, the clamping sleeve also shows an internal toothing 40 and the clamping component, an external toothing 39 engaging with one another in the engagement position and in the rotary position, enabling free rotation. The coil spring 65 is supported at the axially outwardly end on the inner surface of the collar 23. Axially inwardly, the coil spring 65 is supported on the shoulder 31a in the clamping sleeve 31. The coil spring forms a retention device 50a.

The clamping component 13 and the axle 5 are screwed to one another via a threaded component. The thread grooves are additionally glued to one another.

In the engagement position 14, the clamping sleeve 31 is moved axially outwardly. The coil spring 65 compresses to lockout, providing the user with a natural stopper. Alternately, a disk 45 may be clamped between the push button 22 and the clamping component 13 which is illustrated only exemplarily in the top portion of FIG. 13d. In operation, the disk also provides a stopper since in the engagement position the internal toothing 40 axially hits against the disk.

One advantage of the invention is that in the pushed-in position (FIG. 13c) an inadvertent rotation of the operating lever 12 has no effect whatever on the clamping force. To adjust the clamping force, the operating lever must be actively pulled outwardly. On the whole, the invention provides a lightweight quick release device 1 which is very easy to operate. The option of disengaging the operating lever 12 from the clamping component 13 provides for ease of mounting and demounting the wheels. The length of the clamping component 13, which as a rule consists of strong steel, can be noticeably reduced. Even if the clamping component 13 is formed in part or in full from a light metal or the like, the total weight can be considerably reduced. The set axial position and also the set rotary position remain unchanged after releasing the operating lever.

Since every gram of weight counts in sporting bicycles, this will considerably contribute to keeping the weight down. Moreover, the aerodynamics and the optical appearance of a bicycle equipped therewith can be improved for example if a clamping mechanism 3 is only disposed on the rear wheel while the front wheel is only equipped with an axle unit 2.

While a particular embodiment of the present quick release device has been described herein, it will be appreciated by those skilled in the art that changes and modifications may be made thereto without departing from the invention in its broader aspects and as set forth in the following claims.

LIST OF REFERENCE NUMERALS 1 quick release device 37 stop spring
2 axle unit 38 O-ring
3 clamping mechanism 39 external toothing
4 axial direction 40 internal toothing
5 axle, through axle 41 length of overlap
6 locking means 42 diameter
7 first end 43 non-round contour
8 clamping part of 13 44 threaded component
9 fastener 45 disk
10 second end 50 retention device
11 bicycle component 50a retention device
12 operating lever 51 elastic component
13 clamping component 52 depression
14 engagement position 53 peripheral groove in 31
14a axial position 54 peripheral groove in 8
15 rotary position 55 O-ring
15a axial position 56 peripheral groove in 31
16 coupling unit 60 click-in mechanism
17 connecting unit 60a click-in mechanism
18 coupling contour (m) 61 click-in means
19 connecting contour (f) 61a click-in means
20 click-in unit 62 click-in means
21 plug 62a click-in means
22 push button, holding 63 click-in means surface 64 accommodation
23 collar 65 biasing device
25 torque limiter 65a biasing device
26 external thread at 10 66 contact member
27 bayonet joint 100 two-wheeled vehicle,
28 coupling contour (f) bicycle
29 connecting contour (m) 101 wheel, front wheel
30 thread at 22 102 wheel, rear wheel
31 clamping part, clamping 103 frame sleeve 104 fork
31a radial shoulder 105 damper
31b gap 106 handlebar
31c gap 107 saddle
31d internal space 108 hub
32 knurled disk 109 spoke
34 contacting disk 110 rim
35 click recess 111 disk brake
36 snap-in projection 112 drive

The invention claimed is:

1. A clamping mechanism for mounting and demounting bicycle components comprising: at least one operating lever and a clamping component;

the clamping mechanism comprising at least two clamping parts, a first clamping part of which being configured as a clamping sleeve and connected with the operating lever, and a second clamping part of which being formed on the clamping component;

wherein the operating lever can be moved in the axial direction from an engagement position in which it is non-rotatably connected with the clamping component to a rotary position in which it is freely rotatable relative to the clamping component;

in the rotary position, the operating lever is disposed closer to the clamping component than in the engagement position;

at least one click-in mechanism, wherein the click-in mechanism comprises at least two interacting click-in means;

one of the click-in means comprises a peripheral groove in the second of the clamping parts and an elastic component disposed in the peripheral groove;

wherein the two clamping parts lock with one another in two different axial positions in the axial direction; and two spaced apart peripheral grooves are formed in the first clamping part, and wherein the two peripheral grooves are formed on the clamping sleeve, and wherein in the engagement position the elastic component locks in one of the two peripheral grooves of the first clamping part and in the rotary position, in the other of the peripheral grooves of the first clamping part.

2. The clamping mechanism according to claim 1, wherein the operating lever is biased in the rotary position by means of a biasing device.

3. The clamping mechanism according to claim 1, wherein at least one retention device is formed on the clamping component for retaining movement of the operating lever at least in the rotary position.

4. The clamping mechanism according to claim 3, wherein the retention device is configured to retain pivoting of the operating lever relative to the clamping component.

5. The clamping mechanism according to claim 2, wherein the biasing device forms a retention device which retains a pivoting of the operating lever relative to the clamping component at least in the rotary position.

6. The clamping mechanism according to claim 2, wherein the biasing device comprises at least one coil spring that is supported on the clamping component with one of its ends and on the clamping sleeve with the other of its ends.

7. The clamping mechanism according to claim 6, wherein the coil spring when compressed forms an axial stopper for an axial movement of the operating lever.

8. The clamping mechanism according to claim 1, wherein an axial stopper is disposed on the clamping component to limit axial movement of the operating lever.

9. The clamping mechanism according to claim 1, wherein the clamping component comprises a push button attached to an axially outwardly end thereof.

10. The clamping mechanism according to claim 3, wherein the retention device is configured to retain at least one axial movement of the operating lever relative to the clamping component.

11. The clamping mechanism according to claim 1, wherein a periodic outer contour is formed on the clamping component which is provided for form-fitting engagement with a periodic inner contour in the clamping sleeve when the operating lever and the clamping component are in the engagement position, and wherein the periodic outer contour on the clamping component is disengaged from the periodic inner contour in the clamping sleeve when the operating lever and the clamping component are in the rotary position.

12. The clamping mechanism according to claim 11, wherein between the clamping sleeve and the clamping component at least one gap is formed to outwardly seal an internal space between the periodic inner contour and the periodic outer contour.

13. The clamping mechanism according to claim 11, wherein at least in the rotary position the internal space is sealed outwardly by a labyrinth seal having differently oriented gap sections.

14. The clamping mechanism according to claim 11, wherein in the engagement position, a contact member bears against the periodic inner contour and retains a relative motion of the operating lever to the clamping component.

15. The clamping mechanism according to claim 11, wherein in the rotary position, a contact member bears against the periodic inner contour and retains a relative motion of the operating lever to the clamping component.

16. The clamping mechanism according to claim 2, wherein the biasing device is aligned radially.

17. The clamping mechanism according to claim 1, wherein the at least one click-in mechanism biases the operating lever in the engagement position to the engagement position, and wherein the click-in mechanism biases the operating lever in the rotary position to the rotary position so that a transfer of the operating lever from the engagement position to the rotary position and vice versa requires to overcome the prevailing biasing force of the click-in mechanism.

18. The clamping mechanism according to claim 1, wherein in the engagement and/or rotary position a contact member exerts an axial force on at least one of the clamping parts.

19. The clamping mechanism according to claim 1, wherein the at least one click-in mechanism comprises a contact member biased by a biasing device in one of the clamping parts which interacts with at least one non-round contour in the other of the clamping parts.

20. The clamping mechanism according to claim 19, wherein the non-round contour is formed as a periodic surface structure on a surface of the clamping part or wherein the periodic surface structure is formed as a multi-edge profile or a toothing.

21. The clamping mechanism according to claim 1, wherein the clamping component comprises a coupling unit having a non-round coupling contour for coupling the clamping component having a correspondingly mating connecting unit having a non-round connecting contour to a bicycle component.

22. The clamping mechanism according to claim 1, comprising an axle unit.

23. The clamping mechanism according to claim 22, wherein the axle unit is configured as a through axle.

24. The clamping mechanism according to claim 22, wherein the axle unit is fixedly connected with the clamping component.

25. The clamping mechanism according to claim 24, wherein the axle unit is screwed and/or glued with the clamping component.

26. The clamping mechanism according to claim 22, wherein the axle unit comprises an axle extending in the axial direction, a locking means at the first end of the axle unit and a fastener at a second end of the axle unit.

27. The clamping mechanism according to claim 1, wherein the clamping component can be non-rotatably coupled with a bicycle component, and wherein the clamping component can be decoupled from the bicycle component.

28. A two-wheeled vehicle comprising a frame and a fork and an at least partially muscle-powered drive and two wheels, namely a front wheel and a rear wheel, wherein each wheel comprises a hub, comprising the clamping mechanism of claim 1.

29. A clamping mechanism for mounting and demounting bicycle components having an axle unit, comprising: at least one operating lever and a clamping component;

the clamping mechanism comprising at least two clamping parts, one clamping part of which being configured as a clamping sleeve and connected with the operating lever, and another clamping part of which being formed on the clamping component;

wherein the clamping sleeve can be moved in the axial direction relative to the axle unit from an indexable engagement position in which it is non-rotatably connected with the clamping component to a rotary position in which it is freely rotatable relative to the clamping component;

in the rotary position, the operating lever is disposed closer to the clamping component than in the engagement position; and said clamping component has a non-circular contour matingly engaging a corresponding connecting contour of the axle unit.

* * * * *